(12) United States Patent
Arimilli et al.

(10) Patent No.: US 7,526,631 B2
(45) Date of Patent: Apr. 28, 2009

(54) DATA PROCESSING SYSTEM WITH BACKPLANE AND PROCESSOR BOOKS CONFIGURABLE TO SUPPORT BOTH TECHNICAL AND COMMERCIAL WORKLOADS

(75) Inventors: Ravi Kumar Arimilli, Austin, TX (US); Vicente Enrique Chung, Austin, TX (US); Jody Bern Joyner, Austin, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 10/425,421

(22) Filed: Apr. 28, 2003

(65) Prior Publication Data

US 2004/0215926 A1 Oct. 28, 2004

(51) Int. Cl.
*G06F 15/00* (2006.01)
*G06F 15/76* (2006.01)
(52) U.S. Cl. .......................... 712/11; 712/12
(58) Field of Classification Search .................. 712/12; 316/633, 683
See application file for complete search history.

(56) References Cited

U.S. PATENT DOCUMENTS 5,006,961 A * 4/1991 Monico ....................... 361/788
5,689,722 A * 11/1997 Swarztrauber ............... 712/12
2003/0231624 A1* 12/2003 Alappat et al. .............. 370/360

FOREIGN PATENT DOCUMENTS

| JP | 05-11887 | 1/1993 |
|---|---|---|
| JP | 2579419 | 2/1997 |

* cited by examiner

*Primary Examiner*—Jesse R Moll
(74) *Attorney, Agent, or Firm*—Casimer K. Salys; Dillon & Yudell LLP

(57) ABSTRACT

A processor book designed to support both commercial workloads and technical workloads based on a dynamic or static mechanism of reconfiguring the external wiring interconnect. The processor book is configured as a building block for commercial workload processing systems with external connector buses (ECBs). The processor book is also provided with routing logic to enable to ECBs to be utilized for either book-to-book routing or routing within the same processor book. A table specific wiring scheme is provided for coupling the ECBs running off the chips of one MCM to the chips of the second MCM on the processor book so that the chips of the first MCM are connected directly to the chips of a second MCM that is logically furthest away and vice versa. Once the wiring of the ECBs are completed according to the wiring scheme, the operational and functional characteristics reflect those of a processor book configured for technical workloads.

4 Claims, 9 Drawing Sheets

DATA PROCESSING SYSTEM WITH BACKPLANE AND PROCESSOR BOOKS CONFIGURABLE TO SUPPORT BOTH TECHNICAL AND COMMERCIAL WORKLOADS

CROSS REFERENCE TO RELATED APPLICATIONS

The present application shares specification text and figures with the following application, which were filed concurrently with the present application: application Ser. No. 10/425,420 "Processor Book for Building Large Scalable Processor Systems." The content of the co-pending application is incorporated herein by reference.

BACKGROUND OF THE INVENTION

1. Technical Field

The present invention relates generally to data processing systems and in particular to multiprocessor data processing systems. Still more particularly, the present invention relates to a method and system for enabling post-manufacture configuration of multiprocessor data processing system via interconnect method and logic.

2. Description of the Related Art

The evolution of data processing systems for use in commercial applications has occurred at a very rapid pace. This development began with the design and utilization of single processor systems and has evolved to design and utilization of more complex multiple processor systems (MPs). Most of the development has been driven by the increasing need in the industry for greater processing power and faster data operations.

Technical and Commercial servers are two examples of systems that have benefited from the additional processing power and faster overall data operations. Notably, in order to provide the faster overall data operations, quicker access to data is required, and the systems are typically designed with distributed memory systems, with each processor having direct access to an affiliated memory block.

One extension of the increasing the number of processors within the system is the creation of a multi-chip module (or MCM), which provides higher overall frequency. The In particular, the MCM configuration provides increased performance for commercial workloads. Multi-chip modules (MCMs) containing multiple chips each having two or more individual processors has replaced traditional single chip modules (SCMs), which include a single processor. In an MCM, two or more processor chips each comprising multiple processors are interconnected with buses having a particular bandwidth. Thus, for example, a four-processor multi-chip module (MCM) may be designed by interconnecting 4 single-processor chips with 16-byte buses.

FIG. 1 illustrates a conventional 4 processor MCM (also referred to as a 4-way SMP). As shown, MCM 100 includes four single-processor chips 101 interconnected by MCM bus 103 and MCM logic 107. Processor chips 101 of MCM 100 are interconnected to and communicate with each other via 16-byte MCM buses 103 with each chip 101 having a 16-byte MCM input bus and a 16-byte MCM output bus. Each processor chip is directly coupled to two other processor chips on MCM 100.

Each chip 101 contains internal MCM routing logic 107 that manages the inter-chip data transfers on the various buses. MCM routing logic 107 controls both routing to components within MCM 100 and routing to components connected externally to MCM 100. MCM routing logic 107 reads the destination address contained within the data component being routed and selects the appropriate bus on which to route the data component. For example, communication (collectively described herein as data communication, although instructions may also be routed between processor chips) from a processor on chip S to a processor of either of the adjacent processor chips, T or V, are sent by MCM routing logic 107 of chip S on the MCM buses 103 directly coupling the two chips; However, when communication is desired from a processors on chip S to one on chip U (i.e., the processor chip that is logically farthest away and not directly coupled to S), MCM routing logic 107 sends the communication to the processor on chip U via a hop across one of the two adjacent processor chips, T or V. Routing at each stage of the hop is controlled by MCM routing logic 107 on the particular chip. Each communication path between non-adjacent processors has a higher latency because of the extra hop that is required.

Each chip within MCM 100 connects to other external components including memory (not shown) and I/O devices (not shown) via additional buses (e.g., buses labeled 211, 113 and 115 connected directly to each die. The number of additional buses available for connecting external components (i.e., components other than the other processors) is a function of the size of the chip. Typically, only a fixed number of buses can be connected to each die, and thus the connectivity of each chip is limited by the fixed number of buses. Thus, although the 4-chip MCM has been efficiently designed, the 8-processor or 8-chip system with switch interconnect does not scale in performance or costs.

Recent trends in the development of data processing systems to handle large scale or complex tasks include the implementation of both large scale commercial and technical multiprocessor systems (MPs), which each provide respective operating requirements and functional characteristics.

The primary differences between the system configuration and the required operating parameters of a technical SMP and those of a commercial SMP include the following:

(1) technical SMPs typically have fewer processors than "comparable" commercial SMPs (e.g., scalable commercial SMP may be a 32 or 64 way, while a comparable scalable technical SMP may be a 8 or 16 way; and
(2) technical SMPs typically have very high memory bandwidth and low memory latency requirements, while commercial SMPs have lower bandwidth requirements (mostly due to usage of sophisticated caching mechanisms).

These significant differences in the processing requirements of technical SMPs from those of commercial SMPs have led to a different design and manufacturing process for systems being utilized for technical versus commercial workloads.

Typically, these SMPs comprise two or more processors manufactured on processor chips that are interconnected via a bus or switch to each other. These chips are also connected to other components such as memory and input/output (I/O) via respective buses.

Systems designed for commercial workloads are generally not optimized at handling a technical workloads. Unlike commercial workloads, technical workloads utilize significantly less processor resources, but require much greater efficiency with respect to memory bandwidth and latency. Technical processing systems (i.e., SMPs designed to handle technical workloads) thus are typically configured differently from commercial ones.

Related patent application, Attorney Docket No. AUS920030001US1 provides a processor book that enables the development of large scale commercial systems. Specifically, that patent teaches the creation of processor books and utilization of the processor books as building blocks for a large scale commercial system. Owners of such a large scale system who have purchased these processor books may also wish to run some technical applications.

From the above it is clear that a processor book designed to handle technical workloads must be configured in a manner that enables fast and efficient MCM chip to MCM chip and processor-to-memory communication. The actual speed or and efficiency of the MCM chip-to-MCM chip and processor chip-to-memory operations (and vice versa) is primarily dependent on the size of the bus interconnecting the components, the distance between the components (i.e., length of the connecting bus), and the number of hops required to go from the first component to the next.

The latter factor is especially relevant when the destination chip is several hops away from the source chip. Each processor chip operates as a buffer at each hop and holds the communicated data until the data buses are available before forwarding the communication data to the next hop or the destination. Communication latency may thus be extremely long in the commercial SMP configuration depicted in FIGS. 2A and 2B.

Because of the differences in operation requirements between technical and commercial SMPs, both SMP types are manufactured with different functional design (connectivity of processors, size of buses, etc.). Absent the present invention, much of current art degrades commercial or technical performance in order to support both workloads. Also, the higher requirements for technical workload systems results in higher manufacturing costs for a processor book configured for technical workloads than a processor book configured for commercial workloads as illustrated and described above.

The present invention thus recognizes that there would be significant performance gain and cost savings opportunity if a processor book designed for a commercial workload could be easily re-configured to also support a technical workload. A processing system designed for commercial workloads that could be wired post-manufacture for technical workloads without significant additional logic would be a welcomed improvement. These and other benefits are provided by the invention described herein.

SUMMARY OF THE INVENTION

Described is a method and system that enables a commercial workload processor book to be configured post-manufacture to support a technical workload based on a wiring of specific external interconnects according to a pre-established wiring configuration. The processor book is configured as a 8-processor system with two 4-chip MCMs and is utilized as a building block for large scale commercial workload processing systems. The routing logic of the processor book includes additional routing logic to control inter-chip book-to-book routing via the specific external interconnects.

The processor book comprises two multi-chip modules (MCMs) each having a plurality of external interconnects coupled to individual chips within the MCMs. A table is provided with specific wiring scheme indicating a connection sequence to follow when coupling the specific external interconnects connected to the chips of one MCM to the external interconnects of the chips of the second MCM. The chips of the first MCM are connected directly to the chips of a second MCM that is logically furthest away (in terms of number of hops for data transmission within the processor book) and vice versa. Once the wiring of the specific external interconnects are completed according to the wiring scheme, the operational and functional requirements with respect to bandwidth and percentage of memory usage, etc., reflect those of a processor book configured for technical workloads.

In one embodiment, the external buses are the MCM external connector buses (ECBs) typically utilized within a commercial workload processing system to connect a first processor book to another processor book in an industry standard rack. In another embodiment, the Input/Output (I/O) buses of the processor books are utilized to wire the processor chips. The ECBs are then available for coupling to other processor books. According to this latter implementation, a technical workload processing system may be placed within a larger commercial processing system comprising multiple processor books in which certain bandwidth intensive operations are processed at the technical workload processing system while other non-bandwidth intensive operations may occur at the other processor books of the larger commercial processing system.

In addition to the logic, the processor book also comprises a commercial-to-technical selection mechanism that is utilized by a user to select when the processor book is to be utilized as a technical workload processing system or commercial workload processing system. The mechanism may be a latch that is set during power-on of the MCM. In response to the configuration mechanism being set to indicate utilization of the processor book for technical workloads (e.g., the latch being set to high), the routing logic for a technical workload processor book is activated, and the routing logic for a commercial workload processor book is deactivated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The present invention provides an innovative processor book that can be configured for either commercial or technical workloads after manufacture. Prior to the present invention, a processor book was designed for either technical workloads (hereinafter referred to as a technical processor book) or commercial workloads (hereinafter referred to as a commercial processor book), with no opportunity to reconfigure the processor book after manufacture. Thus, a processor book designed to handle technical workloads could not be re-configured to handle commercial workloads and vice-versa.

The invention recognizes the differences in operational functionality and physical connectivity and routing between technical and commercial processor books. In particular, technical processor books have very high memory bandwidth and low memory latency requirements, while commercial processor books have lower memory bandwidth and latency requirements (due to large on-board caches). Consequently, one reason why a commercial processor book cannot be utilized to support a technical workload is the additional hops required when communicating between processor chips of different MCMs, resulting in aggregate less memory bandwidth. As utilized herein, communication refers collectively to the transmission of data and/or instructions on a bus interconnecting any two components in the processor book described in the illustrative embodiments. Therefore, according to the illustrative embodiment, the invention provides optimal connectivity among processor chips of different processor chip groups (e.g., MCMs) within a commercial processor book to create a processor chip-to-processor chip non-blocking interconnect topology that provides the operating features required for technical processor books.

The invention is described below with specific reference to an 8-way SMP book comprised of two interconnected 4-way MCMs (i.e., two MCMs including four chips having a single processor per die). Those skilled in the art appreciate that the features described herein and specific references to a 8-way SMP book are meant solely for illustrative purpose and should not be construed as limiting on the invention, which may equally apply to more complex systems (e.g., 16-way, 32-way, etc.) or less complex systems.

Figure 1:
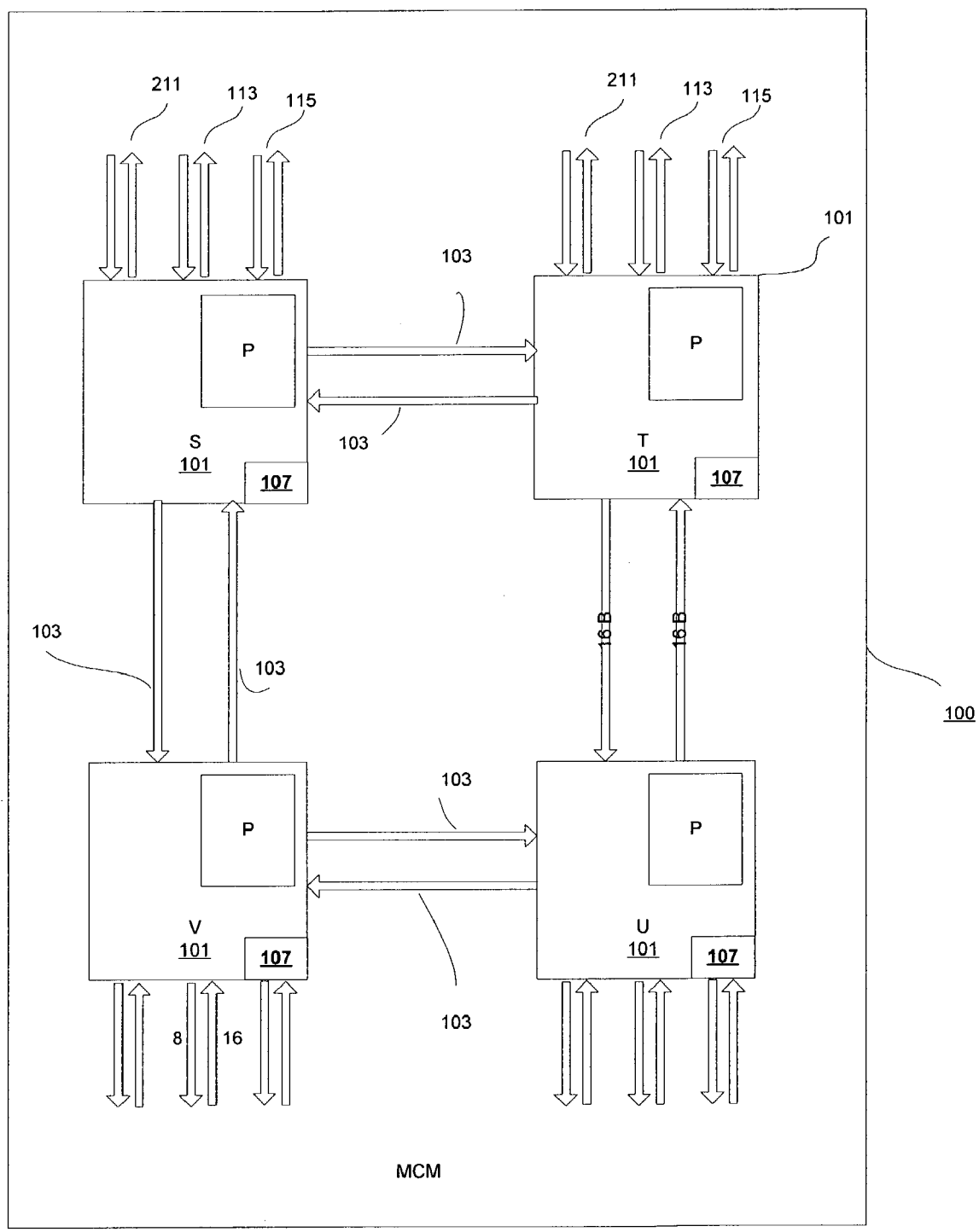
FIG. 1 is a block diagram illustration of a 4-way multi-chip module (MCM) utilized as a building block of a processor book according to one embodiment of the invention.
Figure 2A:
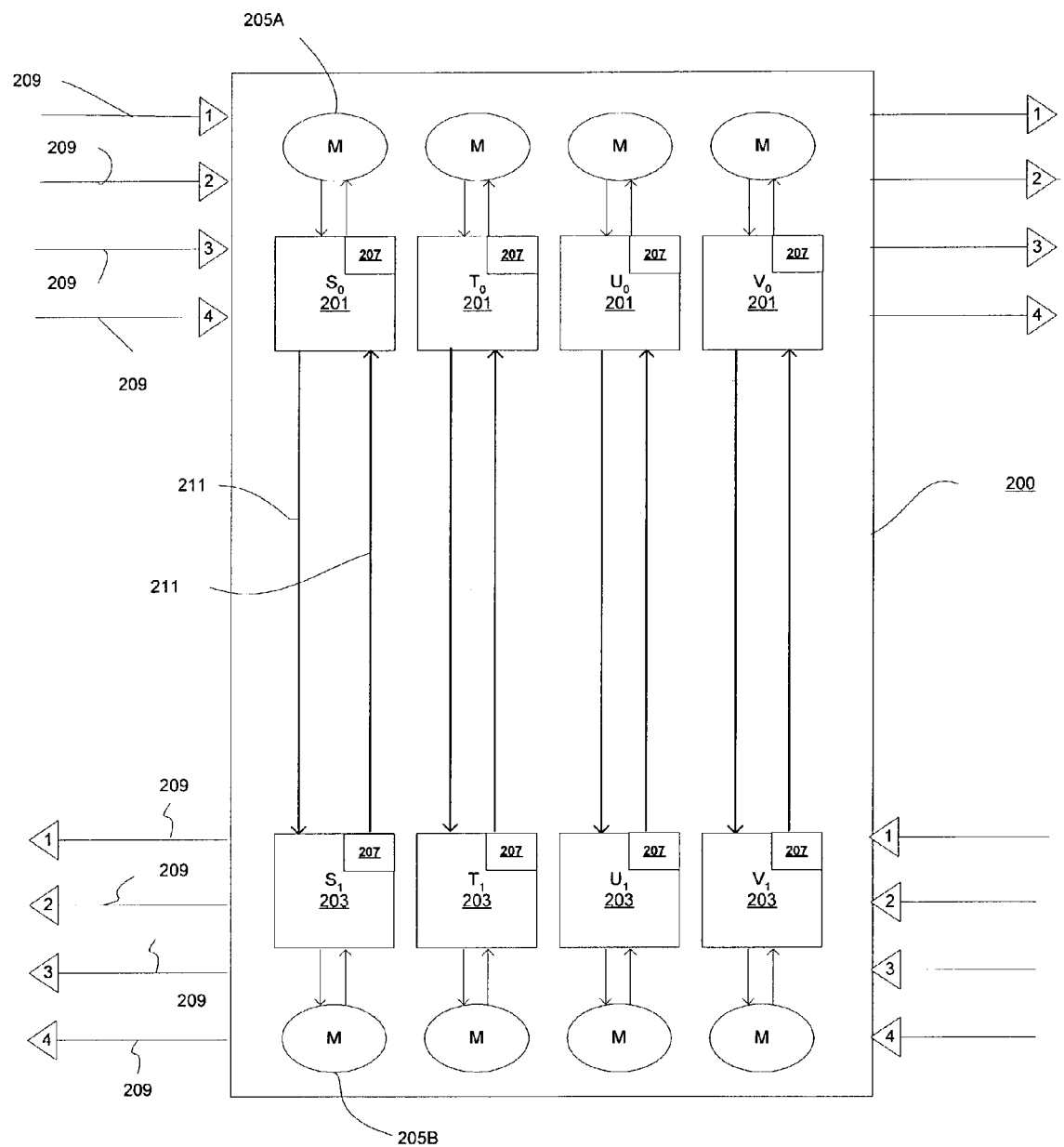
FIGS. 2A and 2B are two illustrations of a processor book designed utilizing two MCMs of FIG. 1 wired together and which may be utilized as either a commercial workload processor book or a technical workload processor book in accordance with implementations of the invention.
Figure 2B:
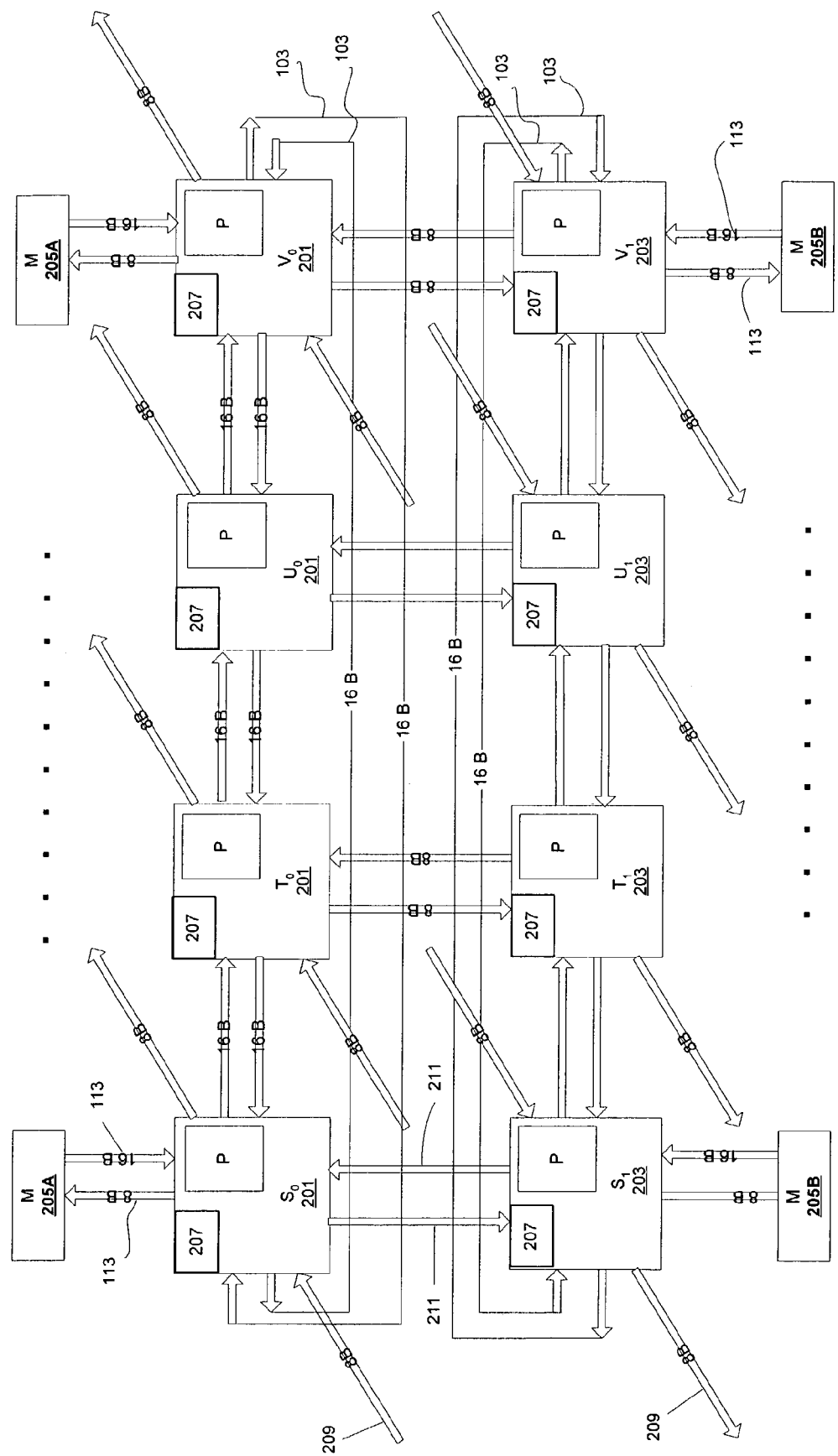

FIG. 2B illustrates the configuration of an 8-way SMP, also referred to as a processor book (i.e., a mother board hosting two interconnected 4-processor MCMs) according to the invention. As shown, processor book 200 comprises a first MCM (i.e., processor chips 201 and related memory components 205A) and a second MCM (processor chips 203 and related memory components 205B). Both the first and second MCMs are 4-way MCMs similar to MCM 200 of FIG. 2A.

As shown in FIGS. 2A and 2B, in addition to 8-byte MCM chip-to-chip buses 103, which directly interconnects the processors, processor chips 201 and 203 of MCM 200 includes the following additional buses: 8-byte MCM expansion control bus (ECB) 209; 8-byte MCM-to-MCM bus 211; and 8-byte memory input and 16-byte memory output buses 113; processor chips 201 and also include 8-byte I/O buses 215 (not shown).

Each chip of processor book 200 also comprises MCM routing logic 207, which also manages the routing of communication between the first MCM and the second MCM. MCM routing logic 207 controls the routing that occurs on all of the external buses of the MCMs including the MCM-to-MCM bus 211 and MCM ECB 209. As shown, a pair of MCM-to-MCM buses 211 run to and from each processor chip of the first MCM from and to the corresponding processor chip of the second MCM (e.g. S0-S1, T0-T1, etc.).

FIG. 2B illustrates the interconnection between the processors of the first MCM and the second MCM within processor book 200 including the MCM expansion buses 209. Processor chips 201, 203 of each MCM are interconnected to each other via 16-byte chip-to-chip buses 103, with each chip having a 16-byte input bus and a 16-byte output bus from both neighboring processor chips on the respective MCM. Connected to the individual processor chips 201, 203 is distributed memory 205A, 205B, each block of which is connected to a respective processor chip via an 8-byte data input bus and a 16-byte data output bus 113. Also shown are a series of MCM ECBs 209, which provide processor chips 201, 203 with connectivity to external components as shown in FIG. 3. According to the invention, in the commercial MPs, MCM ECBs 209 are utilized to interconnect a processor book to other external processor books, such as another 8-way SMP. Thus, the processor books allow for a scalable system as the same chip expands its connections to create a larger and larger loop size of interconnected chips and thus a larger, scalable SMP.

During processor book operation, communication from a first MCM to the second MCM always requires at least one transfer over an 8-byte bus. For example, a communication from S0 to S1 is routed directly on MCM bus 211. Notably, a communication from S0 to U1 requires two intermediate hops (i.e., S0-T0-U0) along the MCM 16-byte bus before being transmitted across the processor book to U1 on the 8-byte MCM bus. Alternatively, the same communication may be routed via the path S0-S1-T1-U1. Determination of the exact route to take is made by MCM routing logic 207, based on current usage on the various paths, etc. Irrespective of which path is taken, the communication takes two hops before arriving at the destination.

Figure 3A:
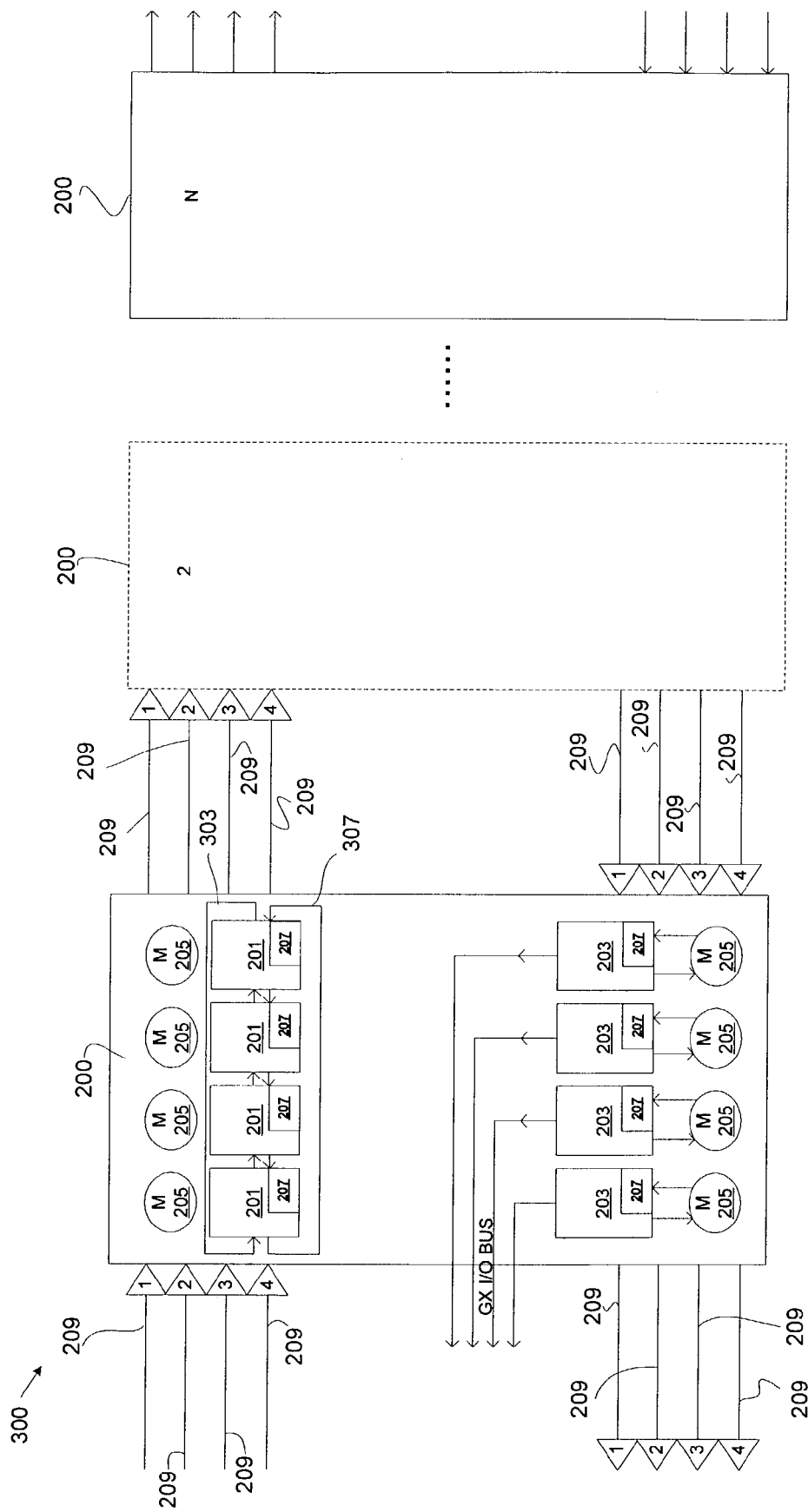
FIGS. 3A and 3B depict N×8-way SMPs comprising N of the 8-way SMPs processor books of FIG. 2A on a system interconnected via the MCM external connector buses (ECBs) to provide a commercial workload server according to one implementation of the invention.
Figure 3B:
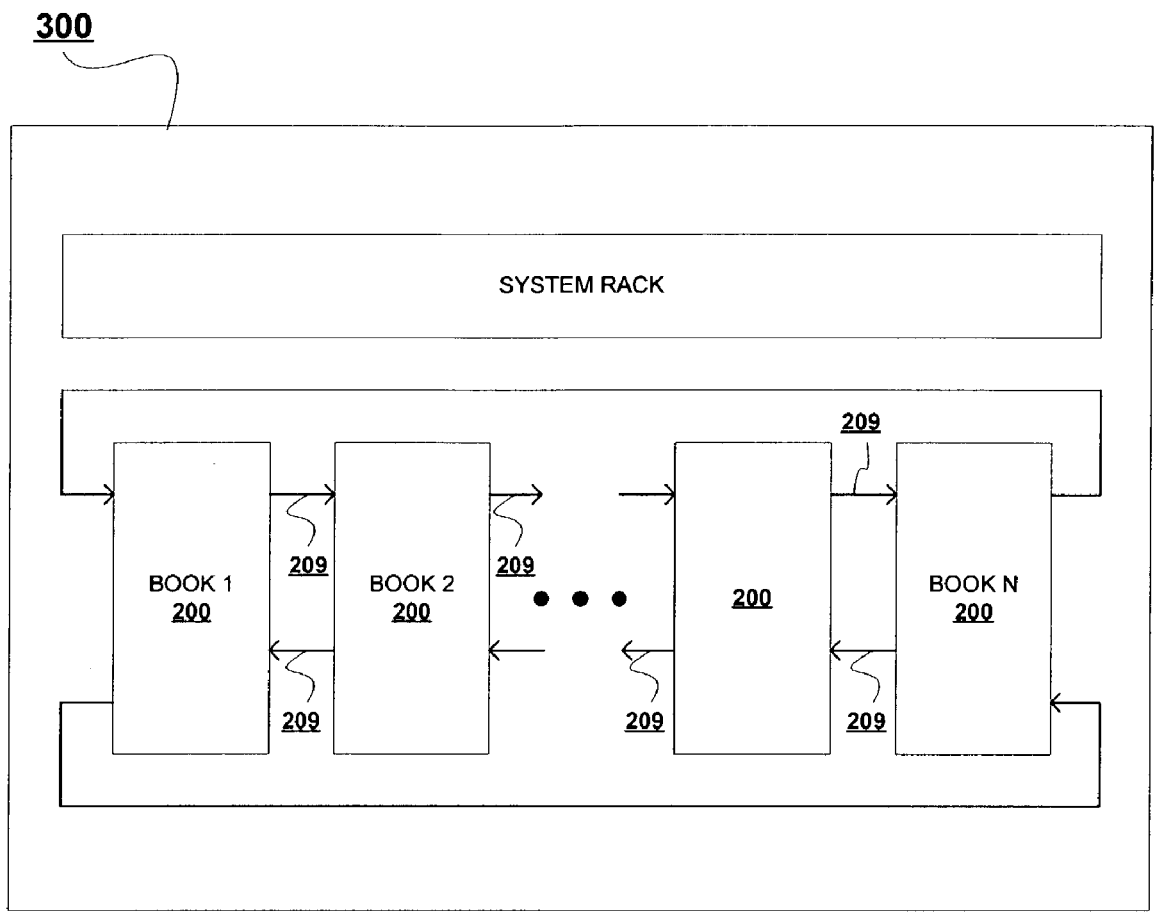

Multiple 8-way processing systems designed according to the configuration shown in FIG. 2A and 2B are often wired together in the manner illustrated by FIGS. 3A and 3B to create a large scale commercial processing system (i.e., a multiprocessor system designed with a large number of processors each having the functional characteristics required to handle commercial data workloads). Typically, a commercial workload requires a processing system that includes a large amount of processing resources, but do not require large amounts of memory bandwidth. For commercial processing, the memory latency of inter-chip communications (due to the additional hops) is acceptable; However, these hops would be non-optimal for technical SMPs as they result in an inefficient utilization of availability memory bandwidth. As a result, the above processor book configuration is optimized to handle commercial workloads (i.e., not technical workloads), which are immune to these deficiencies as described below.

FIG. 3A illustrates a sequence of processor books 200 wired together to form a commercial SMP 300 (i.e., a SMP designed to process commercial workloads) according to one embodiment of the invention. In the commercial arena, large scale data processing systems usually require a large amount of processing capability. In order to provide this processing capability, multiple processor books 200 are wired together using the MCM ECB 209 of the processor chips. These buses are shown running from the first and second MCMs of processor books 200. In this manner, an N×16-way commercial processor system is provided, where N is a positive integer.

Figure 3C:
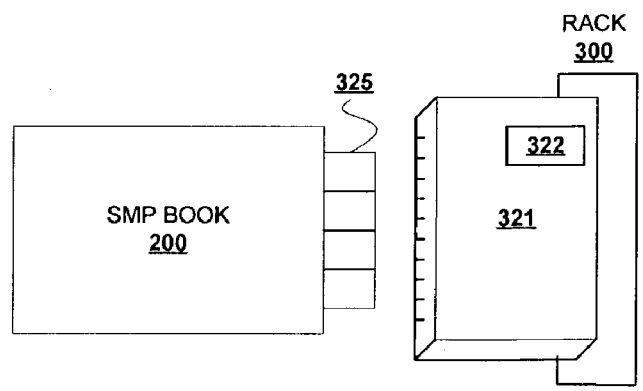
FIG. 3C is a block diagram illustrating connectivity mechanism for each 8-way processor book to the system rack of FIGS. 3A and 3B in accordance with one embodiment of the invention.

FIG. 3B illustrates a similar configuration as FIG. 3A with the processors assembled on system rack 300. System rack 300 comprises a passive backplane on which multiple backplane connectors (illustrated in FIG. 3C) are provided for inter-connecting multiple processor books simultaneously. FIG. 3C illustrates one example of backplane connector 321 of system rack 300. Also shown is sample processor book 200, which includes plug-in connector 325 that "plugs" into backplane connector 321 of system rack 300.

Plug-in connector 325 includes buses, which are the terminating wires of MCM ECBs 209 of processor book 200. Thus, according to the 8-processor configuration of processor book, plug-in connector 325 includes a separate connector bus for each of the 8 output ECBs and each of the 8 input ECBs. Manufacture of system rack 300 is completed separately from that of processor books 200 and thus different manufacturing techniques and/or designs may be utilized to enable the connectivity of processor book 200 to system rack 300 and ultimately to each other processor book.

The passive backplane of system rack 300 includes wiring that is meshed into the base material and inter-connects each backplane connector 321 on system rack 300 similarly to the connectivity illustrated in FIG. 3A. For commercial applications, when processor book 200 is plugged into backplane connector 321 of system rack 300 via plug-in connector 325, the MCM ECBs of processor book 200 connect to the MCM ECBs of the adjacent processor books on the rack similarly to the configurations illustrated by FIGS. 3A and 3B. Thus, use of system rack 300 enables the building of larger an larger commercial SMPs scaled according to the size of system rack 300.

Commercial to Technical Processor Book

When a user of the processor book requires the utilization of the processor book for technical workloads, the user is able to switch the wiring of the ECBs to provide the functionality of a technical processor book. The invention recognizes the need for use of the processor book as a technical workload processor book and provides below a series of additional functional features to enable the processor book 200 developed for plugging into the system rack 200 to be also utilized as a technical workload processor book.

Hardware Wiring Design

Figure 4A:
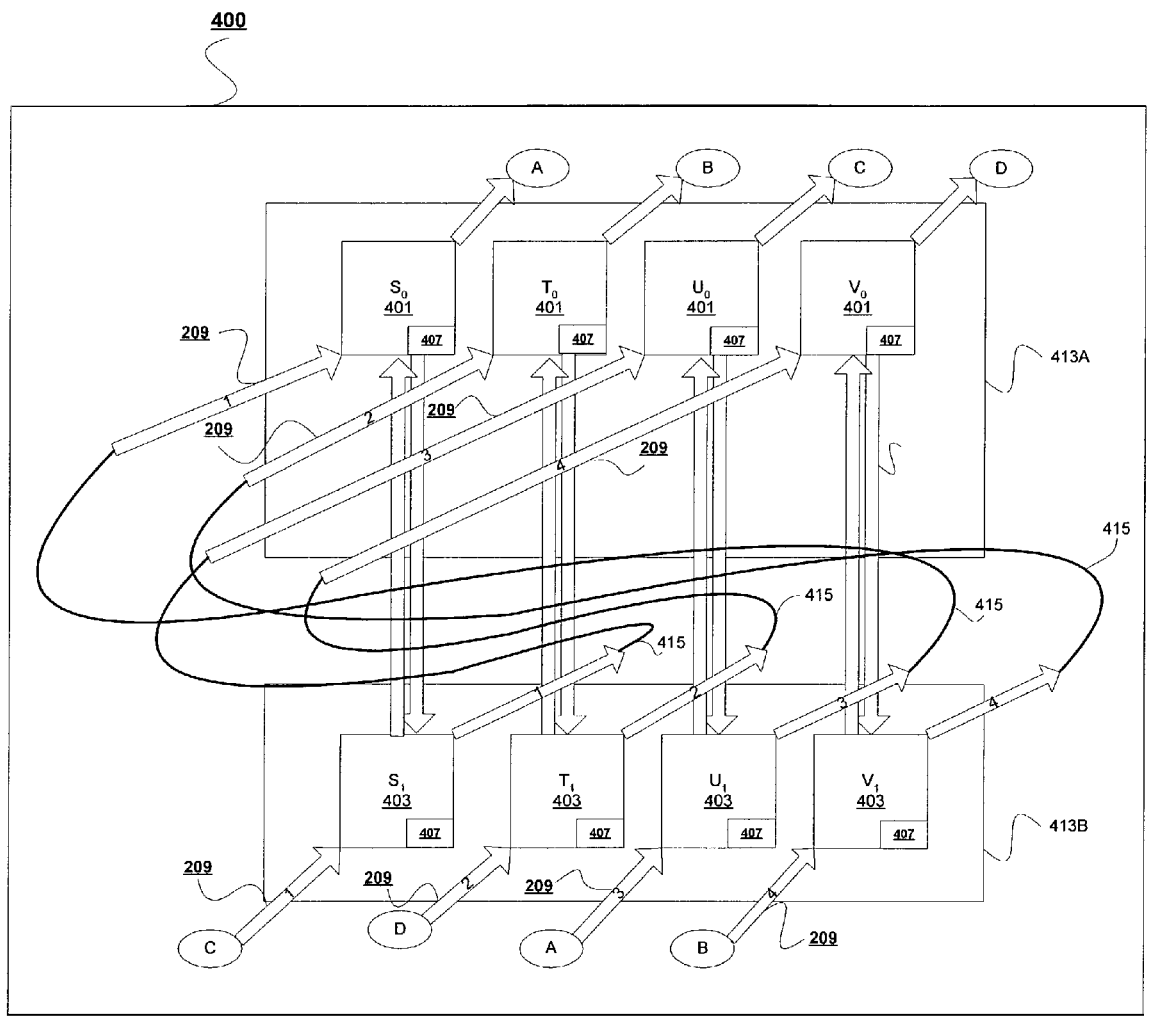
FIG. 4A is a block diagram illustrating an 8-way processor book with MCM ECB buses of one MCM interconnected to processor chips of another MCM within the same book of processors to provide a technical workload server according to one embodiment of the invention.

Turning now to FIG. 4A, there is illustrated an 8-way processor book, comprising two MCMs with specific wiring of external buses 209 via interconnects 415 that is required to reconfigure the processor book 200 from a processor book configuration optimized for commercial workloads to a processor book configuration optimized for technical workloads (i.e., technical processor book 400). Interconnects 415 may be any form of wiring that enables efficient transmission of communications at the desired 8-byte bandwidth. FIG. 4A illustrates the manner in which the external buses (which in the preferred embodiment are external connector buses (ECBs)) 209 of processor chips 203 of the second and first MCMs 413B, 413A within processor book 400 are wired by interconnect 415 to provide technical processor book 400 exhibiting all required functional characteristics required of technical processor book 400. When ECBs are provided as the external buses utilized for the interconnections, the interconnections are preferably completed according to the following wiring scheme:

A. ECB from 1st MCM into 2nd MCM:
  i. S0 to U1; T0 to V1; U0 to S1; V0 to T1
B. ECB from 2nd MCM into 1st MCM:
  i. S1 to U0; T1 to V0; U1 to S0; V1 to T0

For simplicity, the external buses will be referred to hereinafter as ECBs 209 and the illustrated configuration described with the external buses as ECBs wired to each other by interconnects. However, in another embodiment the invention may be implemented with I/O buses (not shown) being wired in the above manner (S0 to U1, etc.), and the routing logic on the chips is then coded to recognize the wired I/O buses to support a technical processor book. With such an implementation, features of the invention may be extended such that the processor book is connected on the system rack 300 to other processor books via the ECBs to provide a larger commercial system that supports commercial workloads, but which forwards all processing that requires technical processing (i.e., high memory bandwidth and faster processing requirements) to the attached technical processor book.

Figure 4B:
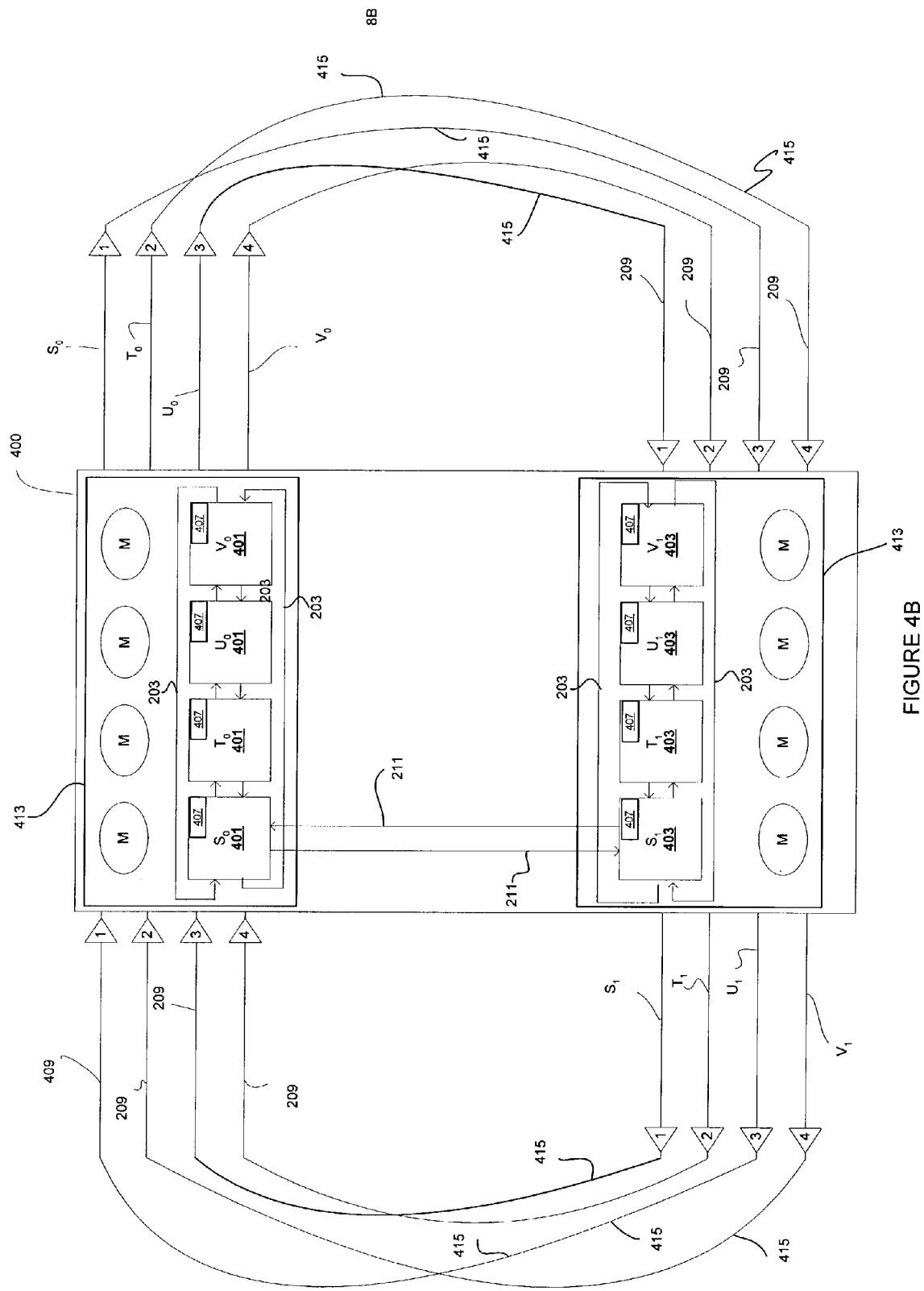
FIG. 4B illustrates a different view of the inter-connectivity required for MCM ECBs of a processor book configured for handling technical workloads according to one embodiment of the invention.

FIG. 4B illustrates another view of 8-way SMP technical processor book 400 with ECBs 209 from processor chips 401 of the first MCM 413A (or upper level group of processor chips) wired to ECBs 209 of processor chips 403 of second MCM 413B (or lower level group of processor chips 401, 403). Thus, as shown in FIG. 4B, in addition to the chip-to-chip buses 403 and MCM-to-MCM buses 211, another set of chip-to-chip wiring is provided using the ECBs 209 coupled via interconnect 415, which directly connect each processor chip 401 of first MCM 413A to a processor chip 403 of second MCM 413B; However, rather than providing connection to the corresponding processor chip (e.g., S0-S1, etc.) as with MCM buses 211, ECBs 209 connect each processor chip to the chip of the other MCM that is logically furthest away. For example, processor chip S0 is connected to processor chip U1, and processor chip T1, is connected to processor chip V0.

The illustrated wiring of ECBs 209 of the processor chips provide an 8-byte direct communication path, eliminating the buffering and additional latency required to transfer an operation across one or more hops to the furthest processor chip on the other MCM. Additionally, the illustrated wiring of ECBs 209 provides an additional (alternate) path from each chip to any of the other chips to which a communication is to be routed. For example, communication form S0 to T1 can be routed as S0-T0-T1, S0-S1-T1, or S0-U1-T1. The last routing path is made possible by the wiring of ECBs 209 as illustrated, and the addition of the last routing path significantly increases the available bus bandwidth for inter-chip communication.

The number sequence followed for interconnecting a particular ECB 209 of first MCM 413B to ECB 209 of second MCM 413B of technical processor book 400 is clearly numerated in the illustration of FIG. 4B. In one embodiment, the respective ECB buses associated with the processor chips are color coded to enable a user or customer to correctly identify which ECB buses connect to each other when converting a commercial book into a technical book. Thus, for example, ECB buses of processors S0 and S1 are red, ECB buses of processor T0 and T1 are blue, etc. The exact color-coding scheme utilized may be different for each manufacturer of the processor chips, and the above example color code is provided solely for illustrative purposes and should not be construed as limiting the invention.

If a particular processor book being connect to system rack 300 is desired for use with a technical workload, certain changes in the connectivity of the particular processor book is required to support the higher bandwidth requirements without memory affinity. Of course, these changes occur post-manufacture and thus requires a delicate allocation of connections between MCM ECBs at plug-in connector 325. In order to accomplish this switch to a technical workload processor book post-manufacture and in an efficient manner, the invention provides several different embodiments that complete change of the "commercially designed" processor book, which was manufactured to be plugged into the system rack 300 and utilized primarily for commercial workloads, into a processor book that supports technical workloads.

Figure 5A:
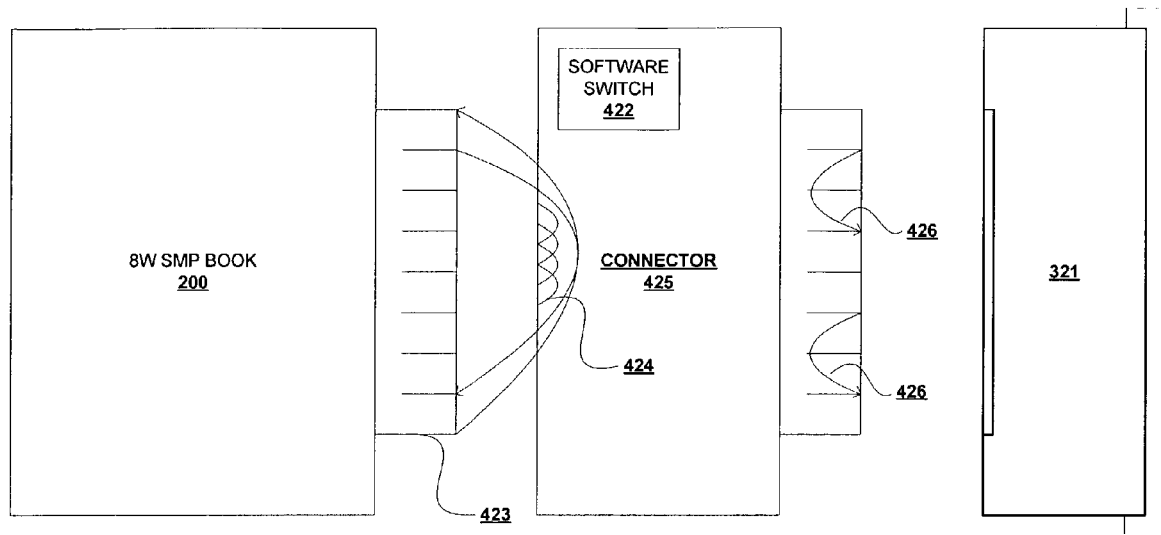
FIG. 5A illustrates an add-on connector that may provide the inter-connectivity of MCM ECBs of a single processor book while the processor book is connected to a system rack according to one embodiment of the invention.
Figure 5B:
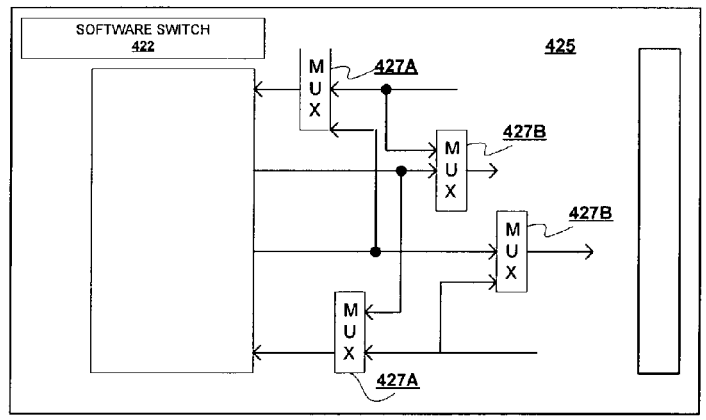
FIG. 5B is a more detailed view of the routing logic that may be included within the add-on connector of FIG. 5A or the bus connector of the processor book according to alternate embodiments of the invention.

The first method involves the selection of specific routing logic to control MUX selectors that are built into the plug-in connector of the processor book, which is wired for bother commercial and technical implementations. According to this implementation, the plug-in connector 325 of the processor book 200 is designed with MUX selector functionality and includes a set of internal re-routed wires that can be selected via the MUX when a technical book is desired. FIG. 5B, described below, illustrates MUX selectors within plug-in connector 325 of processor book 200.

In a second method, the backplane connector 321 is manufactured with the wiring and additional logic that enables either manual or dynamic selection of the technical wiring configuration within the backplane connector. This is accomplished manually via a switch or dynamically via the hypervisor or OS.

A third method is provided in which an add-on connector is designed, which internally re-routes the bus connections of the plug-in connector 325, similarly to the first method described above. As illustrated by FIG. 5A, add-on connector 425 includes a receptor similar to that of backplane connector but also includes a plug-in head 426 similar to plug-in extension 325 of processor book 200. Thus, processor book 200 plugs into add-on connector 425 which is in turn plugged into system rack 300 via backplane connector 321. One implementation of plug in-connector 325 assumes utilization of a dumb connector (i.e., one with no logic components).

Another implementation provides a smart connector having logic for dynamic or manual selection. FIG. 5B illustrates some additional logic that may be included in plug in-connector 325. Notably, other implementations involving similar use of logic to enable the dynamic or manual selection may involve providing the logic within backplane connector 321, or add-on connector 425 (depending on the specific implementation)) to enable selection (dynamic or otherwise) of either regular routing via the ECBs (in a commercial workload processing system) to internalized re-routing required for a technical workload processor book. As shown, the connector includes a series of software-settable internal routing MUXes 427A and external routing MUXes 427B that each receive inputs from both the MCM ECBs of the processor book and the ECBs of adjacent processor books. Selection of particular inputs for each of the MUXes 427A, 427B determines whether the processor book will be configured for processing commercial workload or technical workloads.

During operation, a software signal may be generated that sets the internal routing MUXes 427A to select the MCM ECB inputs over the external ECB inputs as their outputs. Simultaneously, the external routing MUXes 427B are set to select the external ECBs inputs as their outputs. In this way, the re-routing of MCM ECBs according to the table is maintained while the eternal ECBs are routed to the next processor book on system rack 300. Connectivity among the other processor books on system rack 300 is maintained while the processor book operates as a technical processor book.

Returning now to the illustrative embodiment of FIG. 3C, backplane connector 321 includes a selector mechanism 322, which may be a hardware latch that is set 'on' or 'off' by a user or a software latch settable by the hypervisor and/or other software. Selector mechanism 322 is utilized to set the method of connectivity within the connector to one that supports use of the attached processor book for commercial workload or one that supports use of the processor book for technical workloads.

The above implementation on the system rack 300 provides a commercial rack with a node dedicated to technical workload (i.e., high memory bandwidth operations). Because this may be completed at the customer level, the customer does not have to purchase a separate technical workload processor book in addition to the commercial workload processor books and rack already available. Thus for example, a customer with a 32 way commercial workload processing system can reconfigure the system into a 24 way commercial workload system and an 8-way technical workload system with very little effort, except perhaps the purchase of an add-on connector.

Logic Considerations

Figure 4C:
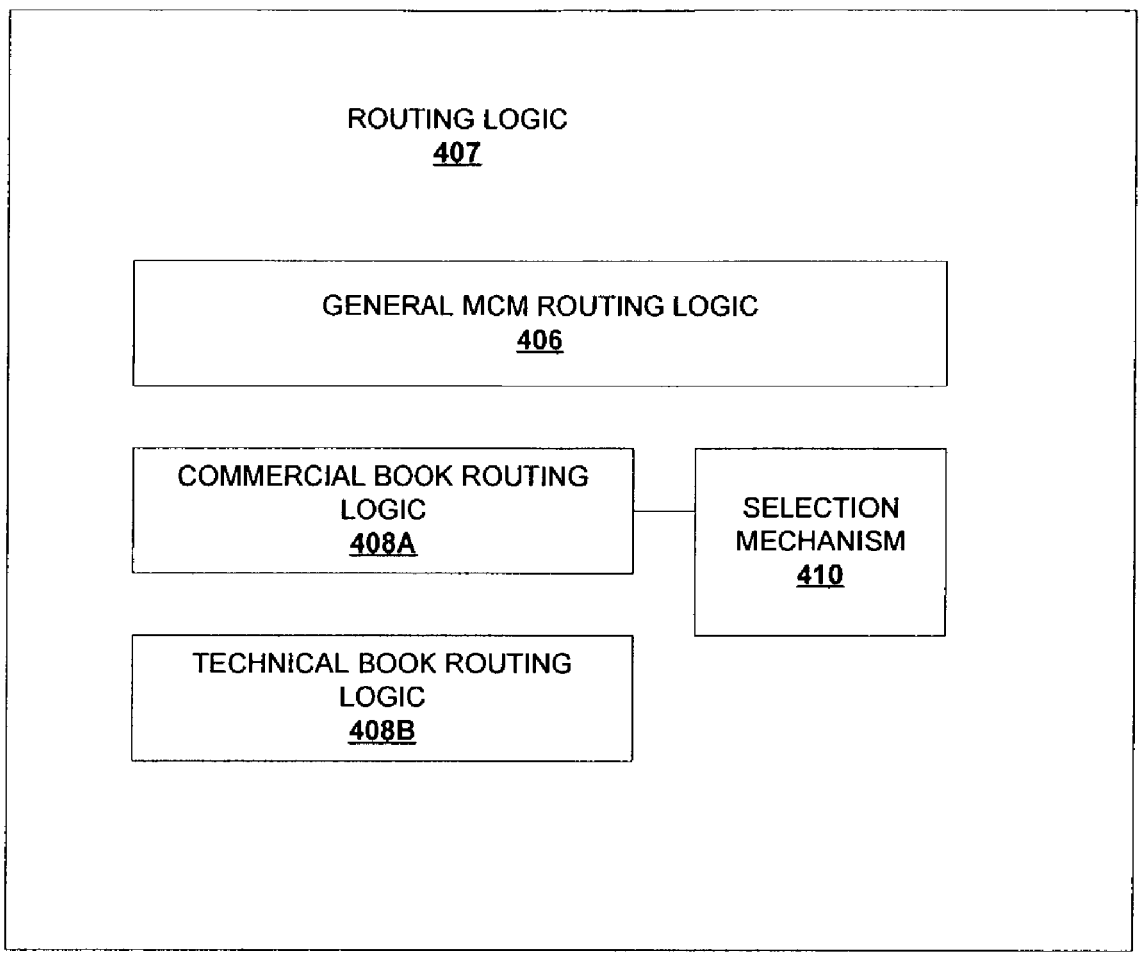
FIG. 4C is a block diagram representation of MCM routing logic with logic component that supports post-manufacture configuration of a processor book for either commercial or technical workloads according to one embodiment of the invention.

Control of the routing features of the technical processor book 400 is provided by built-in MCM routing logic 407 of each processor chip 401, 403, which includes a configuration selection mechanism 410. FIG. 4C provides a block diagram illustration of logic components of MCM routing logic 407. MCM routing logic 407 comprises at least three blocks of logic (i.e., code and required hardware) to route communications to and from each chip on processor book 200. More specifically, according to the illustrative embodiment, MCM routing logic 407 includes commercial routing logic 408A, for implementing the standard routing protocol for ECBs 209 when processor book 200 is configured to operate as a commercial processor book (as when attached to system rack 300), and MCM routing logic 407 includes separate technical routing logic 408B for implementing the routing protocol when processor book 400 is configured (i.e., wired as illustrated in FIGS. 4A and 4B) to operate as a technical processor book. Additionally, MCM routing logic 407 includes a selection mechanism (i.e., a mode bit or software settable latch) 410 that is set during set-up or power-on of the MCM chip or by the OS or system configurable firmware.

According to the illustrative embodiment, the programmer of the processor book selects which of the two controlling logic is activated by setting the selection mechanism 410 to a state (i.e., setting 1 or 0) corresponding to the desired configuration. Thus, selection mechanism 410 may be set to a first state (e.g., 0) that activates the routing logic utilized for a commercial processor book, or alternatively, selection mechanism 410 may be set to a second state (e.g., 1) that activates technical routing logic 408a utilized for a technical processor book. In another embodiment, selection mechanism 410 is a latch that is set to a high or low value, each value corresponding respectively to a selection of technical routing logic 408a or commercial routing logic 408b.

In one embodiment, in which selection of a particular state is not always required, the invention contemplates selection mechanism 410 having a default value that provides a commercial or technical workload configuration. Whenever, the processor chip is powered off, selection mechanism 410 returns to the default value, which may then be changed, if necessary, during power-on-reset by hardware or software programming.

Notably, selection between the routing logic 408a or 408b may also be an automatic feature in some implementations. Accordingly, additional logic checks the ECB wiring when processor book 200 is powered-on to determine whether the ECB wiring conforms to the technical processor book or the commercial processor book. The associated logic for routing communications is then activated and utilized to control the communication between chips during operation. Alternatively, selection of the routing logic using mode bit 410 may be performed automatically by boot code following power-on.

Of course, the operation of processor book 200 as a technical processor book requires ECBs 209 to first be wired according to the configuration provided by FIGS. 4A and 4B. In one implementation, technical routing logic 408a triggers an error message that is sent to an output device coupled to I/O bus whenever the required ECB wiring has not been completed according to the correct wiring scheme provided.

Operational Features

The re-configuration of the processor book from a commercial processor book to one that efficiently handles technical workloads is thus completed by wiring together the ECBs according to the above wiring scheme of FIGS. 4A and 4B. From a technical perspective, the invention builds a technical SMP by connecting the 8-byte ECBs of an originating chip on a first MCM to a destination processor chip on the next MCM of the processor book. That is, the ECB data highways of the two MCMs are connected across modules on a chip-by-chip basis. The standard SMP designed specifically for commercial workloads can thus be re-configured post-manufacture to efficiently process technical workloads.

Several differences in operation are observed when the same processor book is configured as a commercial processor book versus when configured as a technical processor book. Most notably, with the new "re-wired" configuration, operations transmitted between any two chips requires at most one intermediate hop. Thus, the additional bandwidth previously utilized when completing multiple hops is available to convey the transactions of the other processors because in the re-configured processor book, only one bus is required to transmit a transaction to the processor chip logically furthest away. The other bus is no longer utilized and is thus available to convey to other bus transactions occurring within the processor book.

The invention substantially reduces transmission latencies caused by the buffering of a communication at multiple processors during transit. An additional benefit provided by the ECB wiring scheme is the provision of multiple transmission paths, which can be utilized to transmit two chip-to-chip transactions simultaneously from a single processor chip.

Additionally, with the re-configured/re-wired processor book an 8-way SMP is provided across all of the memory without requiring or exhibiting any memory affinity. The increased bandwidth for data transmission enables each memory subsystem to run at substantially 100% of capacity since required data transfer does not have to wait on other processes before gaining access to the data buses. Thus, higher memory bandwidth and lower memory latency are achieved from the 8-way processor book originally designed for commercial workloads so that the processor book is optimized to support a technical workload.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. For example, although each chip is illustrated and described as having a single ECB output and a single ECB input, other bus counts fall within the scope of the invention (e.g., a separate ECB bus for each processor). Also, although described as an 8-way processor book, the invention may be implemented with different size processor books. For example, a 16-way processor book comprising dual processor chips in the same MCM-to-MCM configuration may be utilized. Further, although specific bit sizes are provided for the width of the various buses, the actual widths of the buses, number of buses, and connectivity of the buses may vary by design. It is therefore contemplated that such modifications can be made without departing from the spirit or scope of the present invention as defined in the appended claims.

What is claimed is:

1. A method of enhancing a processor book, having at least two multi-chip modules (MCMs) each having a plurality of processor chips coupled to each other, wherein processor chips of both a first MCM and a second MCM are coupled to each other via intra-chip buses, and each processor chip of said first MCM is coupled to a respective processor chip of said second MCM via an MCM-to-MCM bus, and wherein each processor chip includes an external connector bus (ECB) designed to connect said processor book to components external to said processor book, said method comprising:

directly connecting said ECB of each chip of said first MCM to an ECB of a chip of the second MCM to provide a direct transmission path between a source chip of said first MCM and a destination chip of said second MCM;

directly connecting said ECB of each chip of said second MCM to an ECB of a chip of the first MCM to provide a direct transmission path between a source chip of said second MCM and a destination chip of said first MCM;

wherein said connecting steps are completed according to a pre-set sequence designed to provide a direct path between a source chip of one MCM and a destination chip of another MCM that is a largest number of processor hops away from each other; and wherein further, said connecting steps enable an alternate routing path for data transmission and yields improved transmission latency among processor chips and provides a high percentage memory bandwidth usage.

2. The method of claim 1, wherein said first and said second MCMs both comprise four processor chips, including a first, second, third, and fourth processor chip coupled sequentially by a first set of buses;

said connecting step includes directly connecting each chip of the first MCM to a next chip of the second MCM that is a largest number of processor hops away from each other, said connecting further comprising:

directly connecting an ECB of a first chip of first module to a third chip of second module;

directly connecting an ECB of a second chip of first module to a fourth chip of second module;

directly connecting an ECB of a third chip of first module to a first chip of second module;

directly connecting an ECB of a fourth chip of first module to a second chip of second module;

directly connecting an ECB of a first chip of second module to a third chip of first module;

directly connecting an ECB of a second chip of second module to a fourth chip of first module;

directly connecting an ECB of a third chip of second module to a first chip of first module; and directly connecting an ECB of a fourth chip of second module to a second chip of first module.

3. The method of claim 1, further comprising:

enabling selection of said routing path provided by said connecting steps by positioning a physical switch on said package of said processor book to a position that initiates a routing logic that includes routing via multiple available paths including said routing path.

4. The method of claim 1, wherein, each MCM comprises 4 sequentially coupled chips each having an associated ECB and connected across MCMs in a direct numerical relationship such that a first chip of said first MCM is directly connected to a first chip of said second MCM, wherein:

said wiring step provides an alternate routing path between chips to increase the available transmission bandwidth and reduce transmission latencies.

* * * * *